(No Model.)

T. B. JORDAN.
FRUIT PICKER'S KNIFE.

No. 443,178. Patented Dec. 23, 1890.

Witnesses
M. C. Galer
Alfred J. Townsend

Inventor
Thomas B. Jordan
by Hazard Townsend
his Atty.

UNITED STATES PATENT OFFICE.

THOMAS B. JORDAN, OF LOS ANGELES, CALIFORNIA.

FRUIT-PICKER'S KNIFE.

SPECIFICATION forming part of Letters Patent No. 443,178, dated December 23, 1890.

Application filed August 22, 1890. Serial No. 362,714. (No model.)

*To all whom it may concern:*

Be it known that I, THOMAS B. JORDAN, a citizen of the United States, residing at Los Angeles, in the county of Los Angeles and State of California, have invented a new and useful Fruit-Picker's Knife, of which the following is a specification.

The object of my invention is to provide a knife cheap and simple of construction which will be convenient and will not interfere with the free use of the hand holding it, and which, though easy to apply to the hand, will not be liable to become accidentally disengaged therefrom and will enable the operator to easily cut the stems and pick the fruit with one hand alone.

My invention is adapted for use in picking various kinds of fruits having stems which require to be cut; but it is most desirable for picking grapes. In picking such fruits for market it is desirable that the stems be neatly cut. For this purpose an ordinary knife is much used, but is hard to retain in the hand and necessitates the use of both hands in picking.

My invention consists of a knife having for its handle a thin strip of metal formed into a series of open loops to fit upon the fingers. It also comprises other features, hereinafter set forth.

The accompanying drawings illustrate my invention.

Figure 1:
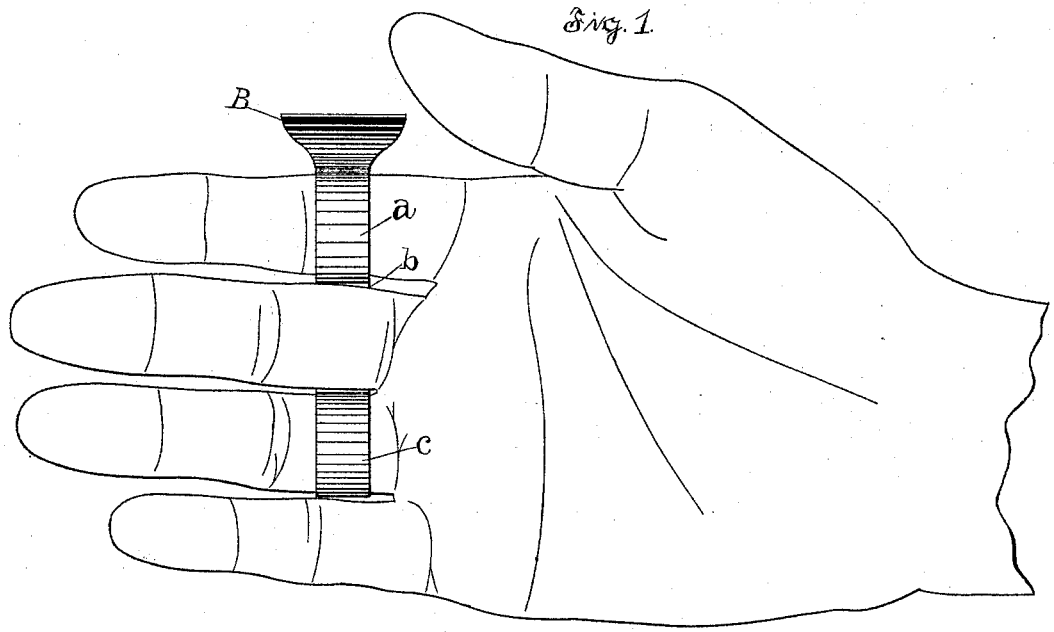
Figure 2:
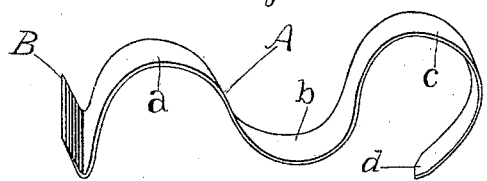
Figure 3:
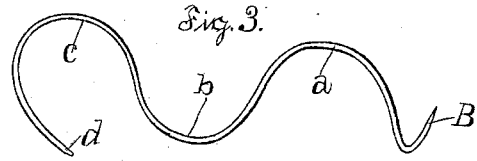
Figure 4:
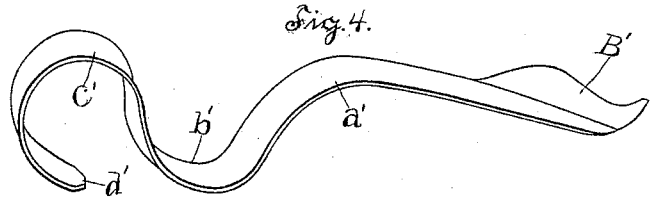

Figure 1 represents my improved fruit-picking knife in position on the hand ready for use. Fig. 2 is a perspective view of my improved knife. Fig. 3 is a plain side view of Fig. 2, in position to receive the fingers of the right hand. Fig. 4 shows a modified form of my invention.

The knife is preferably formed of a thin strip of steel or other suitable metal about one-half inch wide throughout its length to form the handle A, and broadened at one end to form the blade B. The handle portion or main body A is bent into a series of curves forming open loops *a b c*, adapted to fit upon the inside of the fore and third finger and upon the back of the middle finger.

In the form shown in Figs. 1, 2, and 3 the blade is arranged with its edge transverse to the axis of the handle and with its width extending substantially at right angles to such axis, being varied from such angle to such extent as may be desirable to bring the edge of the blade into proper position for most effective use. The blades are made either parallel with or transverse to the axis of the handle.

In Figs. 1, 2, and 3 the blade is shown transverse to the handle. In Fig. 4 it is shown parallel therewith.

The end *d* of the handle is brought sufficiently near the loop or curve *b* of the handle to engage the back of the third finger when the knife is in position, as shown in Fig. 1.

In use the handle is slipped on the hand with the second finger in the loop or curve *b*, the third finger in the open ring or loop *c* at the end of the handle, and the forefinger in curve or loop *a*. The fruit may then be grasped in the hand and held, while the thumb presses the stem, which is then severed by pressing the edge of the knife thereagainst. The handle braces the hand, so that it is not liable to become tired, and the hand and fingers can be used with almost as great freedom as without the knife.

In case the fruit-stems are short and the clusters thickly grown the modified form shown in Fig. 3 is preferable, because the blade can be made of any length desired, and can therefore be inserted between the bunches and in places where the other form (shown in Figs. 1, 2, and 3) could not be inserted without crushing the fruit. This form is also preferable for picking oranges.

The transverse blade shown in Figs. 1, 2, and 3 presents its edge transverse to the stem of the fruit when the fruit is held in the hand, and the thumb naturally stands in position to grasp the stem between it and the curve *a* of the handle, while it at the same time presses the stem against the edge of the knife.

The handle shown gives great freedom to the movement of the fingers; but other means for securing the handle to the hand may be employed in connection with the handle and transverse blade with good results.

By making the handle of a thin narrow strip of metal, broadened at the end to form the blade, I give great freedom to the movement of the fingers, and also secure a blade which can easily be brought into contact with the stem.

Now, having described my invention, what I claim as new, and desire to secure by Letters Patent, is—

1. A knife having for its handle a thin strip of metal formed into a series of open loops to fit upon the fingers.

2. The knife set forth, consisting of a strip of metal having its main body bent into a series of open loops to receive the fingers and provided at one end with a cutting-edge.

THOMAS B. JORDAN.

Witnesses:
JAMES R. TOWNSEND,
ALFRED I. TOWNSEND.